US012774736B2

(12) United States Patent
Mayoux et al.

(10) Patent No.: US 12,774,736 B2
(45) Date of Patent: Oct. 27, 2026

(54) TRANSMISSION FOR A VEHICLE

(71) Applicant: VOLVO TRUCK CORPORATION, Gothenburg (SE)

(72) Inventors: Sylvain Mayoux, Lyons (FR); Matheus Mrtvi, Villeurbanne (FR); Thomas Barillot, Mornant (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/292,073

(22) Filed: Aug. 6, 2025

(65) Prior Publication Data

US 2026/0055804 A1 Feb. 26, 2026

(30) Foreign Application Priority Data

Aug. 23, 2024 (EP) .................................... 24196165

(51) Int. Cl.
*F16H 37/08* (2006.01)

(52) U.S. Cl.
CPC ... *F16H 37/082* (2013.01); *F16H 2200/0021* (2013.01); *F16H 2200/0043* (2013.01); *F16H 2200/2007* (2013.01); *F16H 2200/2094* (2013.01)

(58) Field of Classification Search
CPC ............... F16H 2003/445; F16H 3/663; F16H 2200/2023; F16H 37/082; B60K 2001/001; B60K 1/00
USPC ................................ 475/340, 298, 299, 300
See application file for complete search history.

(56) References Cited

U.S. PATENT DOCUMENTS

| | | | | |
|---|---|---|---|---|
| 953,992 A * | 4/1910 | Folberth | F16H 3/66 | 475/300 |
| 1,309,978 A * | 7/1919 | Baker | F16H 48/08 | 475/299 |
| 1,377,377 A * | 5/1921 | Wheeler | F16H 61/0293 | 475/326 |
| 1,490,644 A * | 4/1924 | Sturmey | B62M 11/14 | 475/281 |

(Continued)

FOREIGN PATENT DOCUMENTS

| | | |
|---|---|---|
| DE | 10 2022 208157 A1 | 2/2024 |
| JP | H04 78352 A | 3/1992 |

(Continued)

OTHER PUBLICATIONS

Search Report for European Patent Application No. 24196165.5 dated Feb. 18, 2025, 16 pages.

*Primary Examiner* — Sherry L Estremsky
(74) *Attorney, Agent, or Firm* — Sage Patent Group

(57) ABSTRACT

A transmission for a vehicle providing at least four gear ratios, comprising an input component drivingly connected to a prime mover, such as an electric motor, and a planetary gear system, comprising a first sun gear, a second sun gear, a single ring gear, and a single planet gear carrier carrying a first set of planet gears in meshing engagement with the first sun gear and a second set of planet gears in meshing engagement with the second sun gear. The ring gear is selectively engageable with one of the input component and a fixed member of the transmission. Both the first and the second sun gears are selectively engageable with the input component, and at least one of the first and second sun gears is selectively engageable with the fixed member.

20 Claims, 5 Drawing Sheets

(56) References Cited

U.S. PATENT DOCUMENTS

| | | | | | |
|---|---|---|---|---|---|
| 1,582,772 | A * | 4/1926 | Moore | F16H 61/0293 | 475/299 |
| 3,721,135 | A * | 3/1973 | Kelley | B23F 1/04 | 475/344 |
| 4,721,013 | A * | 1/1988 | Steuer | B62M 11/16 | 192/217.4 |
| 5,947,858 | A * | 9/1999 | Williams | B60K 17/3467 | 475/206 |
| 8,297,426 | B2 * | 10/2012 | Goto | F16H 63/3026 | 192/48.611 |
| 10,107,366 | B2 * | 10/2018 | Schleich | F16H 3/66 | |
| 10,632,835 | B2 | 4/2020 | Ziemer et al. | | |
| 11,642,950 | B2 | 5/2023 | Martin et al. | | |
| 11,685,245 | B2 * | 6/2023 | Han | B60K 17/08 | 475/150 |
| 11,738,633 | B2 | 8/2023 | Wechs et al. | | |
| 2021/0404536 | A1 | 12/2021 | Schlittenbauer et al. | | |

FOREIGN PATENT DOCUMENTS

| | | | | |
|---|---|---|---|---|
| JP | 2013145001 | A * | 7/2013 | B60K 1/00 |
| WO | WO-2011088849 | A1 * | 7/2011 | F16H 37/046 |
| WO | WO-2020007675 | A1 * | 1/2020 | F16H 3/663 |

* cited by examiner

TRANSMISSION FOR A VEHICLE

CROSS REFERENCE TO RELATED APPLICATION

This application claims foreign priority to European Application No. 24196165.5 filed on Aug. 23, 2024, the disclosure and content of which is incorporated by reference herein in its entirety.

TECHNICAL FIELD

The disclosure relates generally to vehicle transmissions, in particular for electric vehicles. In particular aspects, the disclosure relates to a transmission for a vehicle, a powertrain, and a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In recent years, there has been a trend in the transport industry towards developing powertrains with at least one electric prime mover, i.e., with at least one electric motor for propulsion of the vehicle. To improve efficiency and free up space for mounting batteries for powering the electric motor, it is desirable to have the electric motor provided as close as possible to the driven wheels of the vehicle, such as directly on a driven wheel axle. Such a configuration is often referred to as an electric axle, or E-axle, configuration.

Transmissions for electric heavy-duty vehicles, such as for E-axles, typically need to be compact to provide enough space for batteries and other components. Furthermore, they need to provide a wide range of gear reduction ratios to ensure startability as well as efficiency at cruising speeds. This is particularly challenging for vehicles having a high gross combination weight (GCW), in which the wide range of gear reduction ratios needed may lead to problems with too large steps between available gear ratios. In view of this, there is a strive to develop transmissions suitable for electric heavy-duty vehicles having a high GCW.

SUMMARY

According to a first aspect of the disclosure, a transmission for a vehicle is provided. The transmission comprises:

- an input component configured to be drivingly connected to at least one prime mover of the vehicle,
- a planetary gear system, comprising a first sun gear, a second sun gear, a single ring gear, and a single planet gear carrier carrying a first set of planet gears being in meshing engagement with the first sun gear and a second set of planet gears being in meshing engagement with the second sun gear,
- wherein the ring gear is configured to be selectively engaged with one of the input component and a fixed member of the transmission,
- wherein both the first and the second sun gears are configured to be selectively engaged with the input component, and
- wherein at least one of the first and second sun gears is configured to be selectively engaged with the fixed member of the transmission.

The first aspect of the disclosure may seek to provide a transmission which is suitable for a heavy-duty electric vehicle having a relatively large weight. A technical benefit may include the provision of a space-efficient transmission providing at least four different gear ratios, thanks to the configuration with a single ring gear and double sun gears that are all independently connectable to the input component. The transmission may hence provide on the one hand a sufficient speed reduction for starting of the vehicle in demanding conditions, such as in uphill terrain, and on the other hand a high efficiency at cruising speeds, such as when driving on a highway, by locking the planetary gear system for common rotation to provide a direct gear. Moreover, the step between each two successive gear ratios may be made sufficiently small to avoid power drops during gear shifting. The transmission may further enable gear shifting over the entire range of gear ratios without changing the rotational direction of the prime mover, which may improve drivability and reduce the risk of power drops during gear shifting. Additionally, thanks to the single ring gear, the planetary gear system may be produced at a relatively low cost since the ring gear is usually the most expensive component to produce within the planetary gear system.

Optionally in some examples, including in at least one preferred example, both the first and second sun gears are configured to be selectively engaged with the fixed member of the transmission. A technical benefit may include that a five-speed transmission hereby may be achieved.

Optionally in some examples, including in at least one preferred example, the first and second sets of planet gears are axially separated from one another. Hence, also the first and second sun gears, being in meshing engagement with the first and second sets of planet gears, respectively, may be axially separated from one another.

Optionally in some examples, including in at least one preferred example, the ring gear is configured to be slidable along an axial direction of the transmission between a first position in which it engages the input component, and a second position in which it engages the fixed member of the transmission. A technical benefit may include that a relatively compact and/or cost-efficient transmission may be achieved in comparison with using a separate sleeve or other gear engaging member for engaging the ring gear with the input component and the fixed member. The ring gear may, by sliding it back and forth, be selectively engaged with one of the input component and the fixed member, such as the housing, of the transmission. A neutral position may further be provided, in which the ring gear is not engaged with any one of the input component and the fixed member.

Optionally in some examples, including in at least one preferred example, the transmission further comprises a sleeve mounted for common rotation with the input component, wherein the sleeve is configured to be slidable relative to the input component along an axial direction of the transmission to selectively engage the first sun gear with the input component.

Optionally in some examples, including in at least one preferred example, the first sun gear is configured to be in a fixed axial position relative to the input component. Hence, the sleeve is configured to engage the first sun gear with the input component by sliding the sleeve relative to both the input component and the first sun gear. A technical benefit may include a less complex connection to an actuation interface, used to move the sleeve, in comparison with a solution in which the first sun gear is slidable.

Optionally in some examples, including in at least one preferred example, the first sun gear is configured to be slidable together with the sleeve. Hence, the sleeve is configured to engage the first sun gear with the input component by sliding the first sun gear relative to the input component along the axial direction of the transmission, into an engaged position. A technical benefit may include facilitated assembly of the planetary gear system since the first sun gear does not have to be axially locked in connection with installation.

Optionally in some examples, including in at least one preferred example, the second sun gear is configured to be slidable along an axial direction of the transmission to selectively engage the second sun gear with the input component. Preferably, a shaft of the second sun gear, such as a hollow shaft thereof, may extend through the first sun gear. A technical benefit may include the provision of a relatively compact transmission with few parts, which is relatively easy to assemble since axial locking of the second sun gear is not necessary during installation. Furthermore, the need for supporting bearings for the second sun gear may be eliminated.

Optionally in some examples, including in at least one preferred example, the transmission further comprises stacked first and second sleeves configured to be slidable relative to one another in the axial direction and locked for common rotation, wherein the first sleeve is configured to selectively engage one of the first and second sun gears, and wherein the second sleeve is configured to selectively engage the first sleeve with one of the fixed member and the input component. A technical benefit may include the provision of a relatively compact five-speed transmission.

Optionally in some examples, including in at least one preferred example, the second sun gear has a smaller diameter than the first sun gear. The second set of planet gears may consequently have larger diameters that the first set of planet gears. The first sun gear may further be provided closer to the input component than the second sun gear. A technical benefit may include facilitated actuation of the second sun gear.

Optionally in some examples, including in at least one preferred example, the ring gear is in meshing engagement with the first set of planet gears. When the first set of planet gears and the first sun gear is closer to the input component than the second set of planet gears and the second sun gear, this configuration facilitates engagement of the ring gear with the input component. Furthermore, when the second sun gear has a smaller diameter than the first sun gear and the first set of planet gears are smaller in diameter than the second set of planet gears, the ring gear may be made smaller than if it is in meshing engagement with the second set of planet gears. This may enable a more compact and cost-efficient transmission. Optionally in some examples, including in at least one preferred example, in a first gear ratio of the transmission:

- the ring gear is engaged with the fixed member of the transmission,
- the first sun gear is disengaged from the input component and from the fixed member of the transmission, and the second sun gear is engaged with the input component.

A technical benefit may include the provision of a relatively large gear ratio suitable for startability of a very heavy electric vehicle, such as of a vehicle having a GCW of up to 76 tons, or higher.

Optionally in some examples, including in at least one preferred example, in a second gear ratio of the transmission:

- the ring gear is engaged with the fixed member of the transmission,
- the first sun gear is engaged with the input component, and
- the second sun gear is disengaged from the input component and from the fixed member of the transmission.

A technical benefit may include a relatively small gear step from the first gear ratio to the second gear ratio, reducing the risk of power drops during gear shifting.

Optionally in some examples, including in at least one preferred example, in a third gear ratio of the transmission:

- the ring gear is engaged with the input component,
- one of the first and second sun gears is engaged with the fixed member of the transmission, and
- the other one of the first and second sun gears is disengaged from the fixed member of the transmission and from the input component.

With a single sleeve, four gear ratios (four-speed configuration) may typically be provided since only one of the sun gears may easily be engaged with the fixed member. With the stacked first and second sleeves, enabling both sun gears to be selectively engaged with the fixed member, two different gear ratios may be achieved such that a total of five gear ratios are provided (five-speed configuration).

A technical benefit may include that a relatively small gear step from the second gear ratio to the third gear ratio may be provided, reducing the risk of power drops during gear shifting.

Optionally in some examples, including in at least one preferred example, in a direct gear ratio of the transmission, the planetary gear system is locked for common rotation with the input component. The direct gear ratio may be the fourth gear ratio in a four-speed configuration, and the fifth gear ratio in a five-speed configuration. A technical benefit may include high efficiency at cruising speeds. The direct gear ratio may typically be achieved in several different ways. It is to be noted that, in the direct gear of the transmission, there may still be a speed reduction from the prime mover to the input component of the transmission, such as via a primary reduction gearset.

Optionally in some examples, including in at least one preferred example, the planet gear carrier is configured to be drivingly connected to a driven axle of the vehicle. Hence, the planet gear carrier may constitute an output component of the planetary gear system. The driving connection may be realized via one or more components, such as via a differential gear set, a propeller shaft, an inter-axle differential, a driven shaft such as a driven wheel shaft, etc.

Optionally in some examples, including in at least one preferred example, the transmission further comprises a differential gear set configured to distribute torque to first and second drive shafts configured to drive first and second wheels of the vehicle, respectively, wherein the planetary gear system is configured to be mounted around one of the first and second drive shafts. A technical benefit may include the provision of a compact E-axle configuration.

Optionally in some examples, including in at least one preferred example, the planet gear carrier is fixed for common rotation with a housing of the differential gear set. The housing of the differential gear set may thus constitute an input component of the differential gear set, such that a space-efficient E-axle configuration may be achieved.

According to a second aspect of the disclosure, a powertrain for a vehicle is provided. The powertrain comprises the transmission of the first aspect, and at least one prime mover configured to be drivingly connected to the input component of the transmission. Technical benefits of the powertrain largely correspond to those of the first aspect.

Optionally in some examples, including in at least one preferred example, the at least one prime mover comprises at least one electric machine.

Optionally in some examples, including in at least one preferred example, the at least one prime mover has an output shaft parallel with a driven axle of the vehicle.

Optionally, the output shaft of each prime mover is configured to be drivingly connected to the transmission via a primary reduction gear set comprising a pinion being in meshing engagement with the input component of the transmission, the input component being a gearwheel. If two or more prime movers are provided, each prime mover may be drivingly connected to the same input component via its own pinion.

According to a second aspect of the disclosure, a vehicle comprising the powertrain of the second aspect is provided. The vehicle may preferably be an electric vehicle. The vehicle may be an electric vehicle having a high GCW of 36-84 tons, such as 48-76 tons.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings. The drawings are schematic and not drawn to scale. Like reference numbers refer to like elements throughout the description, unless expressed otherwise.

DETAILED DESCRIPTION

The detailed description set forth below provides information and examples of the disclosed technology with sufficient detail to enable those skilled in the art to practice the disclosure.

An electric heavy-duty vehicle may be driven by one or more electric prime movers, i.e., electric motors. When a single electric motor is provided, it may be positioned similarly as an internal combustion engine of a traditional vehicle. However, to reduce overall power losses and to free up space for mounting batteries for powering the electric motor, it is often desirable to mount the electric motor as close as possible to the driven wheels of the vehicle, such as directly on a driven wheel axle. Such a configuration is often referred to as an electric axle, or E-axle, configuration. An E-axle may sometimes comprise two electric motors providing input power to drive the wheel axle. A transmission is provided for converting torque produced by the electric motor(s).

A transmission for an electric heavy-duty vehicle, such as for an E-axle, typically needs to be compact to provide enough space for batteries and other components, such as bodybuilders and aerodynamic devices e.g., air flow tunnels and similar. Furthermore, it needs to provide a wide range of gear reduction ratios to ensure startability as well as efficiency at cruising speeds. For an electric vehicle having a high gross combination weight (GCW), e.g., 40 tons or more, the wide range of gear reduction ratios needed may lead to problems with too large steps between available gear ratios when a three-speed transmission is used, such as is common in E-axles.

The transmission according to the present disclosure is configured to provide at least four gear ratios to ensure startability as well as efficiency at cruising speed for a vehicle having high GCW. This may enable sufficiently small steps between gear ratios to avoid power drops during gear shifting.

Figure 1:
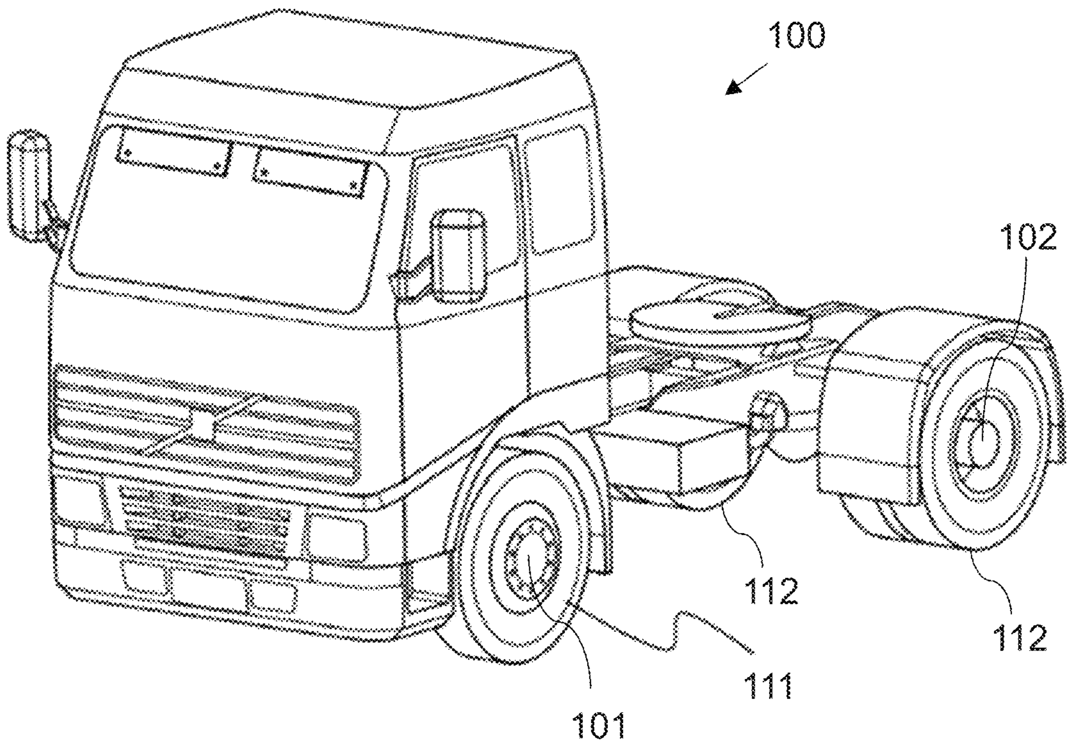
FIG. 1 is an exemplary vehicle according to an example.

FIG. 1 schematically illustrates an exemplary vehicle 100 according to an example.

The vehicle 100 is herein a heavy-duty truck, and more particularly a towing truck for towing one or more trailers (not shown). It shall however be noted that the present disclosure is applicable to any other vehicle, such as any other truck, a bus, a passenger car, construction equipment, such as a wheel loader, an excavator, a dump truck etc.

The vehicle 100 is an electric vehicle comprising a non-driven front axle 101 and a driven rear axle 102. In other examples, the front axle may be a driven axle and the rear axle may be a non-driven axle, or both axles may be driven axles. Furthermore, the vehicle may comprise more than two axles, of which one or more may be driven. A pair of driven wheels 112 is provided on the rear axle 102 and a pair of non-driven wheels 111 is provided on the front axle 101. In other examples, other types of ground engaging members may be used instead of wheels, such as crawlers.

Figure 2:
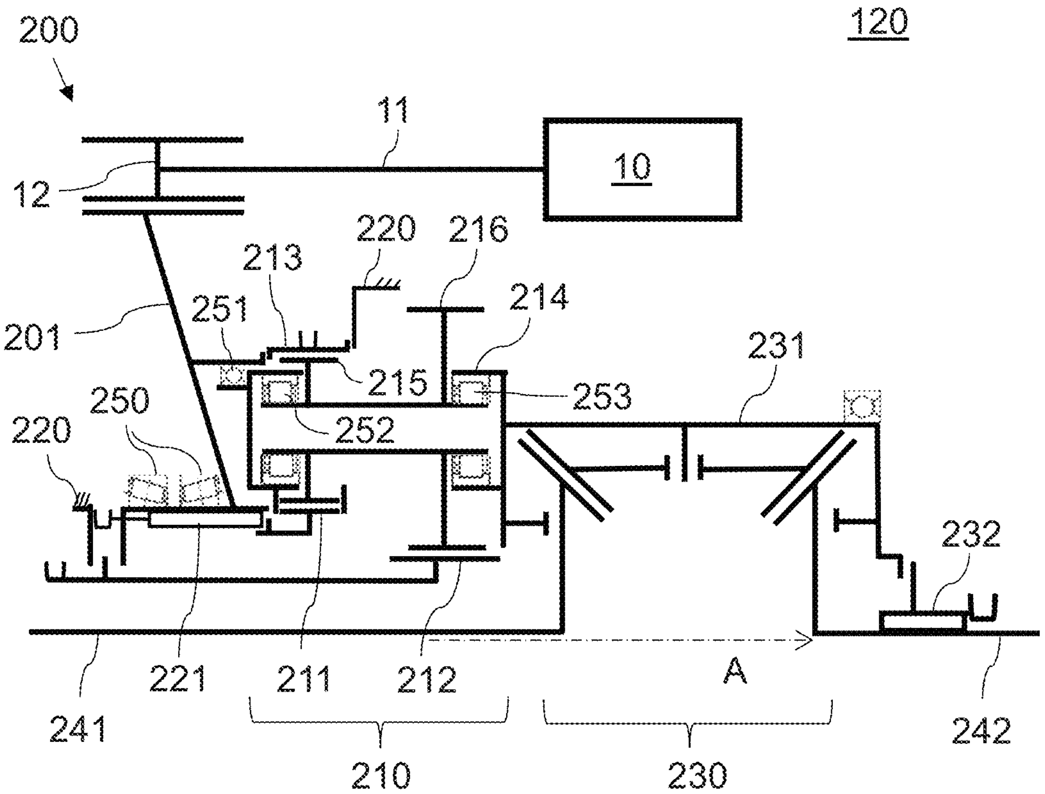
FIG. 2 schematically illustrates parts of a powertrain comprising a transmission according to a first example.

FIG. 2 schematically illustrates parts of a powertrain 120 that may be applied in a heavy-duty vehicle, such as in the vehicle 100 illustrated in FIG. 1. The powertrain 120 comprises a prime mover 10, such as an electric machine, configured to drive first and second drive shafts 241, 242, extending along an axial direction A, via a transmission 200 according to a first example. For illustrational purposes, only half of the transmission 200 is shown, since the transmission 200 is rotationally symmetric with respect to longitudinal axes of the drive shafts 241, 242. The powertrain may further comprise another prime mover (not illustrated), such as another electric machine, drivingly connected to the transmission 200.

The transmission 200 comprises an input component 201, herein a gearwheel of a primary reduction gearset, via which torque is fed to a planetary gear system 210. The planetary gear system 210 comprises two sun gears, namely a first sun gear 211 and a second sun gear 212. The first sun gear 211 is in meshing engagement with a first set of planet gears 215 and the second sun gear 212 is in meshing engagement with a second set of planet gears 216. The first and second sets of planet gears 215, 216 are axially separated from one another and are arranged to rotate together. They are carried by a single planet gear carrier 214, forming an output component of the planetary gear system 210. A single ring gear 213 is further provided, which is in meshing engagement with the first set of planet gears 215. The ring gear 213 is selectively engageable with the input component 201 and with a nonrotating fixed member 220 of the transmission, such as a transmission housing. The ring gear 213 is for this purpose slidable back and forth in the axial direction A between a first position in which it engages the input component 201, and a second position in which it engages the fixed member 220. The engagement with the input component 201 and the fixed member 220, respectively, may be realized using mutually engaging teeth, or splines. In the first position, the ring gear 213 will hence rotate together with the input component 201, at the same rotational speed. In the second position, the ring gear 213 will not be able to rotate. The ring gear 213 may further be provided in a disengaged position in which it is free to rotate with respect to both the fixed member 220 and the input component 201.

The first sun gear 211 is configured to be selectively engaged with the input component 201 via a sleeve 221. The sleeve 221 may be slid between an engaging position, in which it engages the first sun gear 211 with the input component 201, and a disengaging position in which the first sun gear 211 is free to rotate with respect to both the input component 201 and the fixed member 220. The sleeve 221 is mounted for common rotation with the input component 201, i.e., it is configured to rotate together with the input component 201. Splines may be provided for this purpose. The sleeve 221 is further slidable with respect to the input component 201 along the axial direction A. The first sun gear 211 is in a fixed axial position relative to the input component 201. Mutually engaging teeth, or splines, may be used to realize the engagement between the sleeve 221 on the one hand and the input component 201 on the other hand. When engaged, the first sun gear 211 rotates together with the input component 201.

The second sun gear 212 is configured to be selectively engaged with the input component 201 by sliding the second sun gear 212 into a first position in which it engages the first component 201 such that the first component 201 and the second sun gear 212 rotate together. The second sun gear 212 is further configured to be selectively engaged with the fixed member 220 of the transmission 200 by sliding it into a second position in which it engages the fixed member 220 such that it is not able to rotate relative to the fixed member 220. Mutually engaging teeth, or splines, may be used to realize the engagements with the first component 201 and the fixed member 220, respectively. The second sun gear 212 may further be slid to a disengaged position in which it is free to rotate with respect to both the fixed member 220 and the input component 201.

The second sun gear 212 has a smaller diameter than the first sun gear 211 and is configured to slide radially inside the first sun gear 211. The first and second sun gears 211, 214 are both concentrically arranged around the first drive shaft 241. The input component 201 is herein also concentrically arranged around the first drive shaft 241, and has a larger diameter than the ring gear 213.

The primary reduction gearset comprises, apart from the input component 201, a pinion 12 being in meshing engagement with the input component 201. The pinion 12 is drivingly connected to the prime mover 10 via an output shaft 11 of the prime mover. The output shaft 11 extends in parallel with the drive shafts 241, 242. The pinion 12 is hence a cylindrical gear. The primary reduction gearset may be selected so as to provide a reduction ratio sufficient for startability of the vehicle. Hence, for a relatively heavy vehicle, a primary reduction gearset providing a relatively large primary reduction ratio may be selected. For example, the primary reduction gearset in an electric vehicle 100 having a high GCW may be selected such that a total reduction ratio from the electric machine to the driven wheels is about 50:1.

In other non-illustrated examples, the input component may be a gearwheel which is axially connected to the prime mover. The input component may in some examples be drivingly connected to the prime mover without any speed reduction, i.e., at a gear ratio of 1:1. Furthermore, in some examples, the prime mover may be drivingly connected to the input component via a bevel gear. In some examples, a primary reduction gearset comprising more than one selectable gears may be provided. A clutch (not shown) may be provided to selectively connect and disconnect the prime mover.

The transmission 200 herein further comprises a differential gear set 230 configured to distribute torque to the first and second drive shafts 241, 242 and enable the drive shafts 241, 242 to rotate at different rotational speeds. The differential gear set 230 has a housing 231 to which the planet carrier 214 of the planetary gear system 210 is connected for common rotation. Hence, torque is distributed from the planetary gear system 210 to the differential gear set via the combined planet carrier 214 and housing 231. A differential locking member 232 is further provided for selectively locking the differential gear set 230 such that the drive shafts 241, 242 are unable to rotate relative to one another.

Engagement between two components as described herein may be achieved by mutually engaging teeth. Alternatively, splines, bosses, recesses, keys, or similar, may be used. Sliding of a slidable component as described herein, such as of a gearwheel or a sleeve, may be achieved by using an actuator and a gear shifting device, such as a shift fork, controlled by the actuator.

Bearings are provided to support the components relative to the fixed member 220, such as the transmission housing, and/or relative to one another, and enable relative rotation. For example, two tapered rolling element bearings 250 may be used to support the input component against the fixed member 220. A ball bearing 251 may be used to support the input component 201 against the planet carrier 214. Rolling element bearings 252, 253 may be used to support the sets of planet gears 215, 216, respectively, against the planet gear carrier 214. Axial thrust between meshing gears may be counteracted by back taper of the engaging gear teeth, or alternatively by bearings able to support axial loads.

Figure 3:
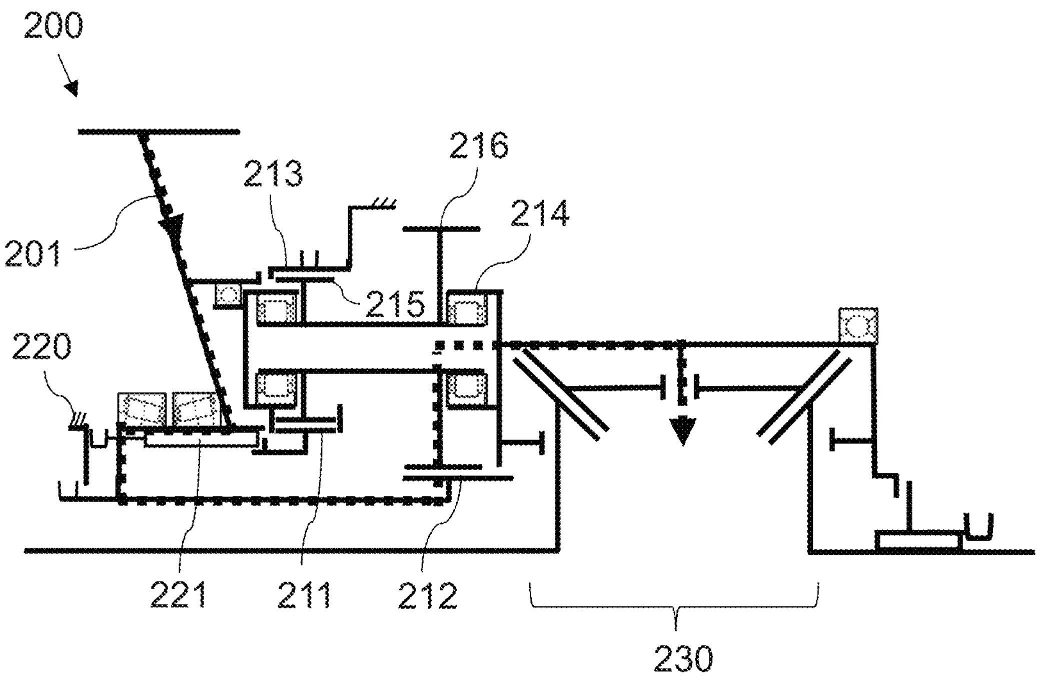
FIG. 3 illustrates power flow through the transmission of the first example at a first gear ratio.

FIG. 3 illustrates power flow at a first gear ratio of the transmission 200 illustrated in FIG. 2. The power flow is indicated using dotted arrows. In the first gear ratio, the ring gear 213 is engaged with the fixed member 220 of the transmission 200, i.e., the ring gear is slid to its second position (to the right in FIGS. 2-3). The first sun gear 211 is disengaged from the input component 201 and from the fixed member 220, i.e., the sleeve 221 is slid to its disengaging position (to the left). The second sun gear 212 is engaged with the input component 201, i.e., it is slid to its first position (to the right). Hence, torque fed to the input component 201 is transferred to the differential gear set 230 via the second sun gear 212, the second set of planet gears 216, and the planet gear carrier 214. In some examples, the first gear ratio may be between slightly over 4:1 up to 16:1, such as between 5:1 and 10:1. For example, the first gear ratio may be 6:1. The gear ratio herein refers to the ratio between rotational speed of the input component 201 and rotational speed of the planet gear carrier 214, constituting an output component of the planetary gear system 210. Hence, a total speed reduction ratio from prime mover 10 to driven wheels 112 may be significantly larger, depending on e.g. the primary reduction gearset. The first gear ratio may be suitable for starting of the vehicle 100 in demanding conditions, such as in an uphill slope.

Figure 4:
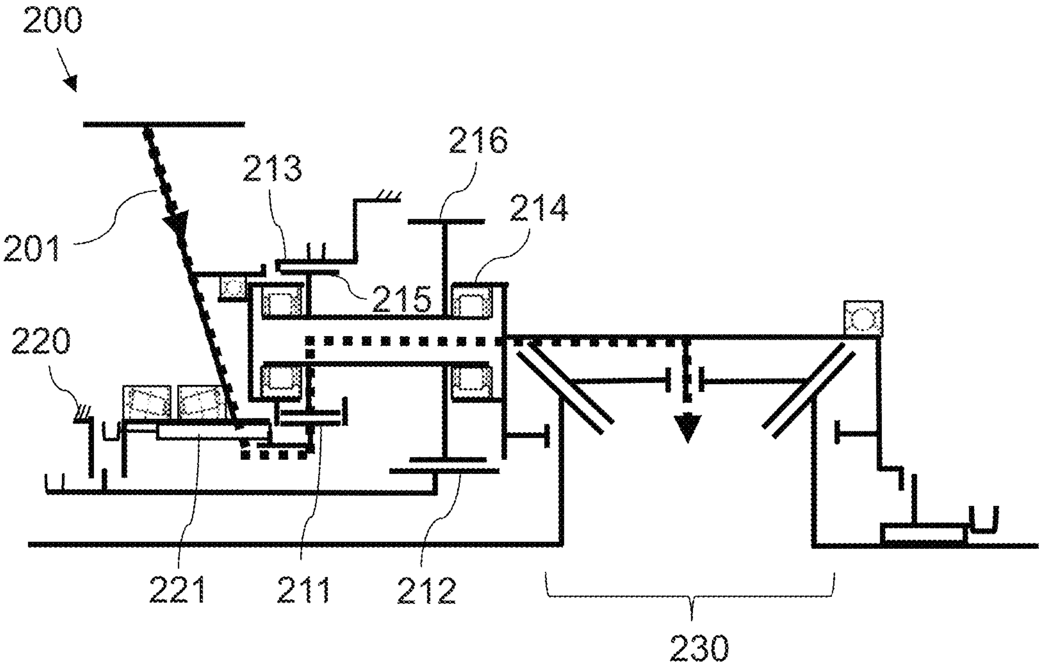
FIG. 4 illustrates power flow through the transmission of the first example at a second gear ratio.

FIG. 4 illustrates power flow at a second gear ratio of the transmission 200 illustrated in FIG. 2. In the second gear ratio, the ring gear 213 is engaged with the fixed member 220, i.e., the ring gear 213 is slid to its second position (to the right). The first sun gear 211 is engaged with the input component 201 via the sleeve 221 being in its engaging position (to the right). The second sun gear 212 is disengaged from the input component 201 and from the fixed member 220 by being slid to its disengaged position (middle). Hence, torque fed to the input component 201 is transferred to the differential gear set 230 via the sleeve 221, the first sun gear 211, the first set of planet gears 215, and the planet gear carrier 214. The second gear ratio is smaller than the first gear ratio. In some examples, the second gear ratio may be between slightly over 2:1 up to 10:1, such as between 3:1 and 6:1. For example, when the first gear ratio is 6:1, the second gear ratio may be 3:1.

Figure 5:
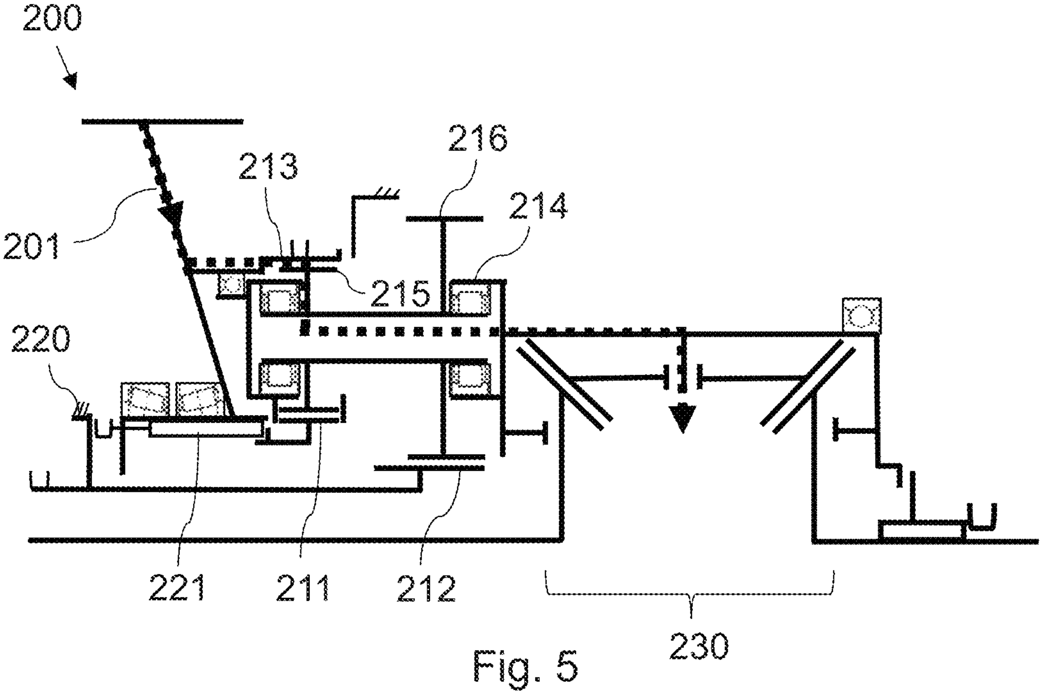
FIG. 5 illustrates power flow through the transmission of the first example at a third gear ratio.

FIG. 5 illustrates power flow at a third gear ratio of the transmission 200 illustrated in FIG. 2. In the third gear ratio, the ring gear 213 is engaged with the input component 201, i.e., the ring gear 213 is slid to its first position (to the left). The first sun gear 211 is disengaged from the fixed member 220 as well as from the input component 201, by means of the sleeve 221 being in its disengaging position (middle). The second sun gear 212 is engaged with the fixed member 220 by being slid to its second position (to the left). Hence, torque fed to the input component 201 is transferred to the differential gear set 230 via the ring gear 213, the first set of planet gears 215, and the planet gear carrier 214. For example, when the first gear ratio is 6:1, the third gear ratio may be 1.2:1. If the larger first sun gear is engaged to the fixed member instead of the smaller second sun gear, a larger third gear ratio may be provided, such as 1.5:1, depending on the relative sizes of the gearwheels.

Figure 6:
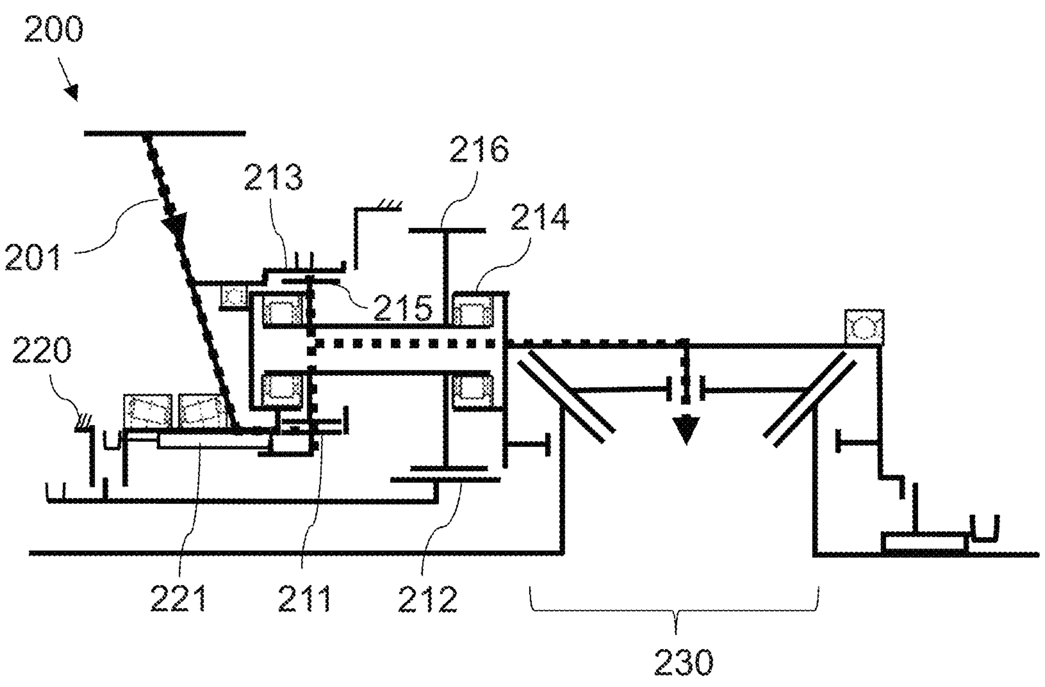
FIG. 6 illustrates power flow through the transmission of the first example at a direct gear ratio.

FIG. 6 illustrates power flow at a direct gear ratio, i.e., 1:1, of the transmission 200 illustrated in FIG. 2. A direct gear ratio may be achieved in several ways by locking at least two components of the planetary gear system together, such as by engaging them both with the input component 201. The planetary gear system 210 will thereby rotate together with the input component 201. In FIG. 6, the direct gear ratio is achieved by engaging both the ring gear 213 and the first sun gear 211 with the input component 201 and bringing the second sun gear 212 to its disengaged position. In other examples, the direct gear ratio may be achieved by engaging the ring gear 213 and the second sun gear 212 to the input component 201 while disengaging the first sun gear 211. In yet other examples, the direct gear ratio may be achieved by engaging both sun gears 211, 212 to the input component 201 and disengaging the ring gear 213. The direct gear ratio may be used when the vehicle travels at cruising speed, such as when travelling on a highroad or similar.

Figure 7:
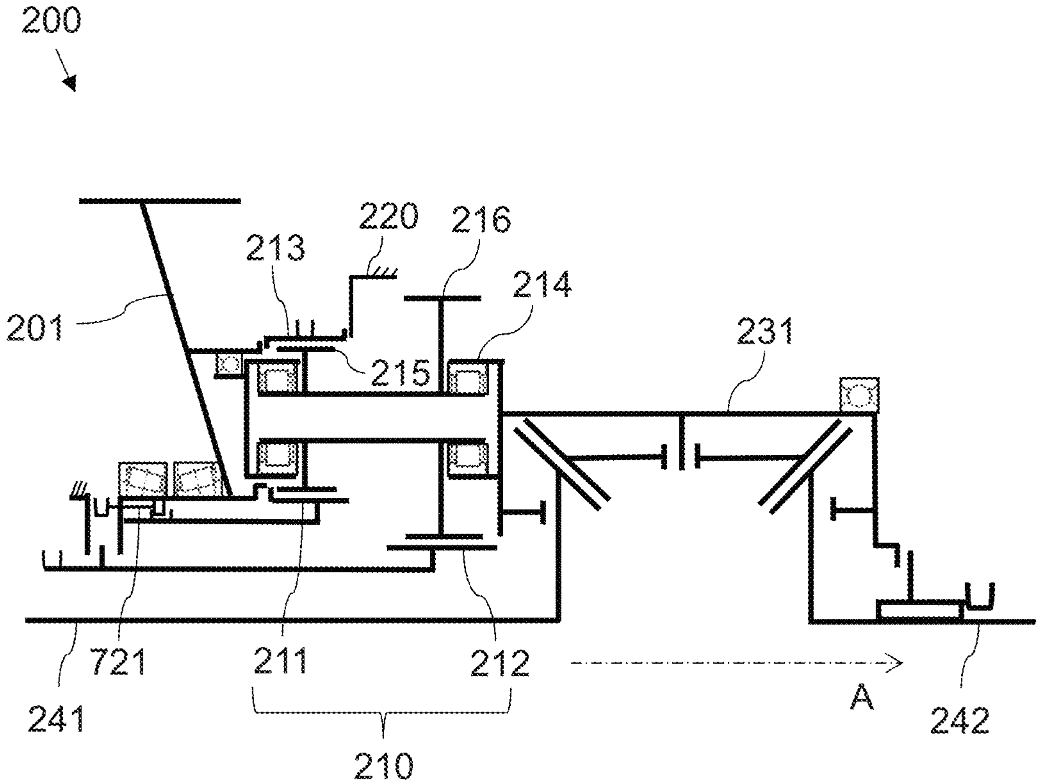
FIG. 7 illustrates a transmission according to a second example.

FIG. 7 illustrates the transmission 200 according to a second example. The transmission 200 according to the second example is similar to the first example and the same reference numbers are used to refer to the various components of the transmission 200 as in the first example. The transmission 200 according to the second example differs from the first example in that the first sun gear 211 is slidable relative to the input component 201 together with a sleeve 721. Hence, instead of sliding the sleeve 221 relative to both the input component 201 and the first sun gear 211 as in the first example, the sleeve 721 and the sun gear 211 are slid together between an engaged position (to the left) and a disengaged position (to the right). In FIG. 7, the first sun gear 211 is in the disengaged position.

Similar to the transmission 200 according to the first example, the transmission 200 according to the second example is configured to provide four gear ratios ranging from a high gear ratio provided for startability to a direct gear ratio for cruising speeds.

Figure 8:
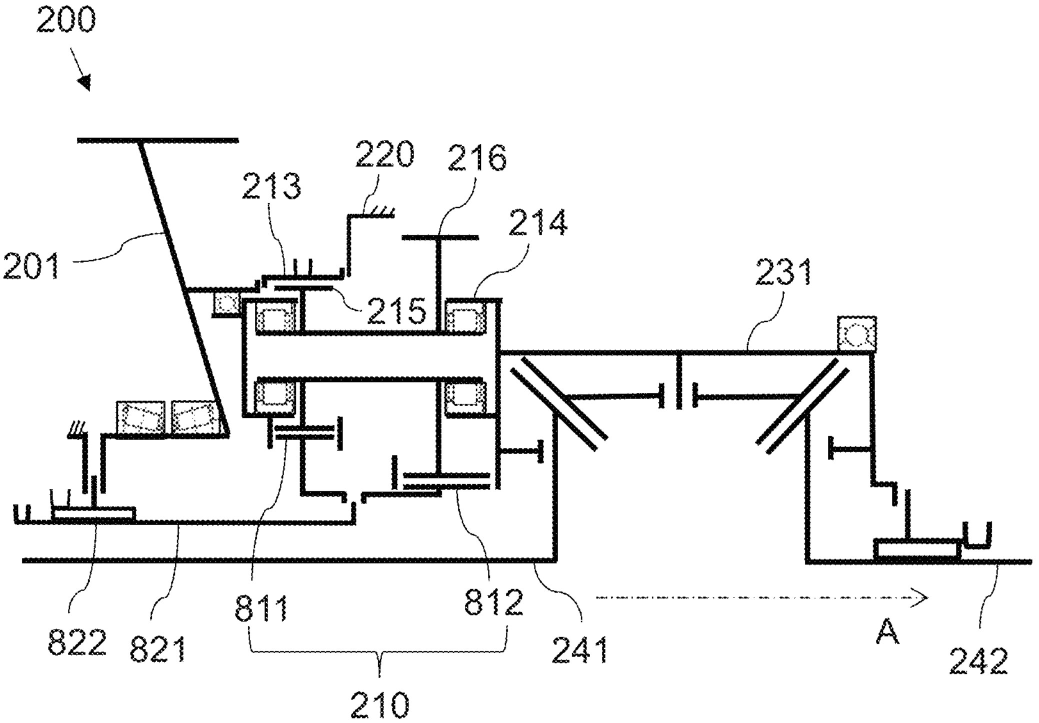
FIG. 8 illustrates a transmission according to a third example.

FIG. 8 illustrates the transmission 200 according to a third example. The transmission 200 according to the third example is configured to provide five gear ratios instead of four. For this purpose, the first sun gear 811 and the second sun gear 812 have a slightly different configuration than in the first and second examples. Both the first and second sun gears 811, 812 are in fixed axial positions relative to the input component 201 and the fixed member 220 of the transmission 200. Both sun gears 811, 812 are selectively and individually engageable to the input component 201 and to the fixed member 220 via stacked first and second sleeves 821, 822. The stacked first and second sleeves 821, 822 are configured to be slidable relative to one another in the axial direction A. They are locked for common rotation, such as via splines. The first sleeve 821 is configured to selectively engage with one of the first and second sun gears 811, 812. Hence, when the first sleeve 821 engages with the first sun gear 811, it rotates together with the first sun gear 811, and vice versa. When the first sleeve 821 is disengaged, both sun gears 811, 821 may rotate relative to the first sleeve 821. The second sleeve 822 is herein mounted radially outside of the first sleeve 821 and is configured to selectively engage the first sleeve 821 with one of the fixed member 220 and the input component 201. In this way, the first sun gear 811 may be engaged to either one of the input component 201 and the fixed member 220, or it may be disengaged. Similarly, the second sun gear 812 may be engaged to either one of the input component 201 and the fixed member 220, or it may be disengaged. Hence, when the ring gear 213 is engaged with the input component 201 and torque is transferred via the ring gear and the first set of planet gears 215 to the planet carrier 214, the gear ratio will depend on which one of the first sun gear 811 and the second sun gear 812 is engaged with the fixed member 220. By engaging the smaller second sun gear 812 with the fixed member 220, a slightly smaller gear ratio is achieved than when the larger first sun gear 811 is engaged with the fixed member 220.

In the following, a list of numbered examples of the disclosure is provided.

Example 1. A transmission (200) for a vehicle (100), comprising:
- an input component (201) configured to be drivingly connected to at least one prime mover (10) of the vehicle (100),
- a planetary gear system (210), comprising a first sun gear (211, 811), a second sun gear (212, 812), a single ring gear (213), and a single planet gear carrier (214) carrying a first set of planet gears (215) being in meshing engagement with the first sun gear (211, 811) and a second set of planet gears (216) being in meshing engagement with the second sun gear (212, 812),
- wherein the ring gear (213) is configured to be selectively engaged with one of the input component (201) and a fixed member (220) of the transmission (200),
- wherein both the first and the second sun gears (211, 811; 212, 812) are configured to be selectively engaged with the input component (201), and wherein at least one of the first and second sun gears (211, 811; 212, 812) is configured to be selectively engaged with the fixed member (220) of the transmission (200).

Example 2. The transmission of example 1, wherein both the first and second sun gears (811, 812) are configured to be selectively engaged with the fixed member (220) of the transmission (200).

Example 3. The transmission of example 1 or 2, wherein the first and second sets of planet gears (215, 216) are axially separated from one another.

Example 4. The transmission of any one of the preceding examples, wherein the ring gear (213) is configured to be slidable along an axial direction (A) of the transmission (200) between a first position in which it engages the input component (201), and a second position in which it engages the fixed member (220) of the transmission (200).

Example 5. The transmission of any one of the preceding examples, further comprising a sleeve (221, 721) mounted for common rotation with the input component (201), wherein the sleeve (221, 721) is configured to be slidable relative to the input component (201) along an axial direction (A) of the transmission (200) to selectively engage the first sun gear (211) with the input component (201).

Example 6. The transmission of example 5, wherein the first sun gear (211) is configured to be in a fixed axial position relative to the input component (201).

Example 7. The transmission of example 5, wherein the first sun gear (211) is configured to be slidable together with the sleeve (721).

Example 8. The transmission of any one of the preceding examples, wherein the second sun gear (212) is configured to be slidable along an axial direction (A) of the transmission (200) to selectively engage the second sun gear (212) with the input component (201).

Example 9. The transmission of any one of examples 1 to 4, further comprising stacked first and second sleeves (821, 822) configured to be slidable relative to one another in an axial direction (A) of the transmission (200) and locked for common rotation, wherein the first sleeve (821) is configured to selectively engage one of the first and second sun gears (811, 812), and wherein the second sleeve (822) is configured to selectively engage the first sleeve (821) with one of the fixed member (220) and the input component (201).

Example 10. The transmission of any one of the preceding examples, wherein the second sun gear (212, 812) has a smaller diameter than the first sun gear (211, 811).

Example 11. The transmission of any one of the preceding examples, wherein the ring gear (213) is in meshing engagement with the first set of planet gears (215).

Example 12. The transmission of any one of the preceding examples, wherein, in a first gear ratio of the transmission (200):

the ring gear (213) is engaged with the fixed member (220) of the transmission (200), the first sun gear (211, 811) is disengaged from the input component (201) and from the fixed member (220) of the transmission (200), and the second sun gear (212, 812) is engaged with the input component (201).

Example 13. The transmission of any one of the preceding examples, wherein, in a second gear ratio of the transmission (200):

the ring gear (213) is engaged with the fixed member (220) of the transmission (200), the first sun gear (211, 811) is engaged with the input component (201), and the second sun gear (212, 812) is disengaged from the input component (201) and from the fixed member (220) of the transmission (200).

Example 14. The transmission of any one of the preceding examples, wherein, in a third gear ratio of the transmission (200):

the ring gear (213) is engaged with the input component (201), one of the first and second sun gears (211, 811; 212, 812) is engaged with the fixed member (220) of the transmission (200), and the other one of the first and second sun gears (211, 811; 212, 812) is disengaged from the fixed member (220) of the transmission (200) and from the input component (201).

Example 15. The transmission of any one of the preceding examples, wherein, in a direct gear ratio of the transmission (200), the planetary gear system (210) is locked for common rotation with the input component (201).

Example 16. The transmission of any one of the preceding examples, wherein the planet gear carrier (214) is configured to be drivingly connected to a driven axle (102) of the vehicle (100).

Example 17. The transmission of any one of the preceding examples, further comprising a differential gear set (230) configured to distribute torque to first and second drive shafts (241, 242) configured to drive first and second wheels (112) of the vehicle (100), respectively, wherein the planetary gear system (210) is configured to be mounted around one of the first and second drive shafts (241, 242).

Example 18. The transmission of example 17, wherein the planet gear carrier (214) is fixed for common rotation with a housing (231) of the differential gear set (230).

Example 19. A powertrain (120) for a vehicle (100), comprising the transmission (200) of any one of the preceding examples, and at least one prime mover (10) configured to be drivingly connected to the input component (201) of the transmission (200).

Example 20. A vehicle (100) comprising the powertrain (120) of example 19.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A transmission for a vehicle, comprising:

an input component configured to be drivingly connected to at least one prime mover of the vehicle, and a planetary gear system, comprising a first sun gear, a second sun gear, a single ring gear, and a single planet gear carrier carrying a first set of planet gears being in meshing engagement with the first sun gear and a second set of planet gears being in meshing engagement with the second sun gear, wherein the ring gear is configured to be selectively engaged with one of the input component and a fixed member of the transmission, wherein both the first and the second sun gears are configured to be selectively engaged with the input component, and wherein at least one of the first and second sun gears is configured to be selectively engaged with the fixed member of the transmission, the transmission further comprising a sleeve mounted for common rotation with the input component, wherein the sleeve is configured to be slidable relative to the input component along an axial direction of the transmission to selectively engage the first sun gear with the input component.

2. The transmission of claim 1, wherein both the first and second sun gears are configured to be selectively engaged with the fixed member of the transmission.

3. The transmission of claim 1, wherein the first and second sets of planet gears are axially separated from one another.

4. The transmission of claim 1, wherein the ring gear is configured to be slidable along an axial direction of the transmission between a first position in which it engages the input component, and a second position in which it engages the fixed member of the transmission.

5. The transmission of claim 1, wherein the first sun gear is configured to be in a fixed axial position relative to the input component.

6. The transmission of claim 1, wherein the first sun gear is configured to be slidable together with the sleeve.

7. The transmission of claim 1, wherein the second sun gear has a smaller diameter than the first sun gear.

8. The transmission of claim 1, wherein the ring gear is in meshing engagement with the first set of planet gears.

9. The transmission of claim 1, wherein, in a first gear ratio of the transmission:

the ring gear is engaged with the fixed member of the transmission, the first sun gear is disengaged from the input component and from the fixed member of the transmission, and the second sun gear is engaged with the input component.

10. The transmission of claim 1, wherein, in a second gear ratio of the transmission:

the ring gear is engaged with the fixed member of the transmission, the first sun gear is engaged with the input component, and the second sun gear is disengaged from the input component and from the fixed member of the transmission.

11. The transmission of claim 1, wherein, in a third gear ratio of the transmission:

the ring gear is engaged with the input component, one of the first and second sun gears is engaged with the fixed member of the transmission, and the other one of the first and second sun gears is disengaged from the fixed member of the transmission and from the input component.

12. The transmission of claim 1, wherein, in a direct gear ratio of the transmission, the planetary gear system is locked for common rotation with the input component.

13. The transmission of claim 1, wherein the planet gear carrier is configured to be drivingly connected to a driven axle of the vehicle.

14. The transmission of claim 1, further comprising a differential gear set configured to distribute torque to first and second drive shafts configured to drive first and second wheels of the vehicle, respectively, wherein the planetary gear system is configured to be mounted around one of the first and second drive shafts.

15. The transmission of claim 14, wherein the planet gear carrier is fixed for common rotation with a housing of the differential gear set.

16. A powertrain for a vehicle, comprising the transmission of claim 1, and at least one prime mover configured to be drivingly connected to the input component of the transmission.

17. A vehicle comprising the powertrain of claim 16.

18. A transmission for a vehicle, comprising an input component configured to be drivingly connected to at least one prime mover of the vehicle, and a planetary gear system, comprising a first sun gear, a second sun gear, a single ring gear, and a single planet gear carrier carrying a first set of planet gears being in meshing engagement with the first sun gear and a second set of planet gears being in meshing engagement with the second sun gear, wherein the ring gear is configured to be selectively engaged with one of the input component and a fixed member of the transmission, wherein both the first and the second sun gears are configured to be selectively engaged with the input component, wherein at least one of the first and second sun gears is configured to be selectively engaged with the fixed member of the transmission, wherein the second sun gear is configured to be slidable along an axial direction of the transmission to selectively engage the second sun gear with the input component.

19. A powertrain for a vehicle, comprising the transmission of claim 18, and at least one prime mover configured to be drivingly connected to the input component of the transmission.

20. A transmission for a vehicle, comprising, an input component configured to be drivingly connected to at least one prime mover of the vehicle, and a planetary gear system, comprising a first sun gear, a second sun gear, a single ring gear, and a single planet gear carrier carrying a first set of planet gears being in meshing engagement with the first sun gear and a second set of planet gears being in meshing engagement with the second sun gear, wherein the ring gear is configured to be selectively engaged with one of the input component and a fixed member of the transmission, wherein both the first and the second sun gears are configured to be selectively engaged with the input component, wherein at least one of the first and second sun gears is configured to be selectively engaged with the fixed member of the transmission, the transmission further comprising stacked first and second sleeves configured to be slidable relative to one another in an axial direction of the transmission and locked for common rotation, wherein the first sleeve is configured to selectively engage one of the first and second sun gears, and wherein the second sleeve is configured to selectively engage the first sleeve with one of the fixed member and the input component.

* * * * *